3,198,622
CHEMICAL-PHYSICAL TREATMENT OF ORES, AND/OR ORE RESIDUES
Eugene Herzog and Laszlo Backer, Nancy, France, assignors to Societe des Acieries de Pompey, Pompey (Meurthe & Moselle), France, a corporation of France
Filed Mar. 5, 1962, Ser. No. 177,278
Claims priority, application France, Mar. 15, 1961, 855,748; July 1, 1961, 863,682, 863,683; July 12, 1961, 867,854; Aug. 19, 1961, 871,162; Aug. 21, 1961, 871,172; Jan. 22, 1962, 885,492
9 Claims. (Cl. 75—1)

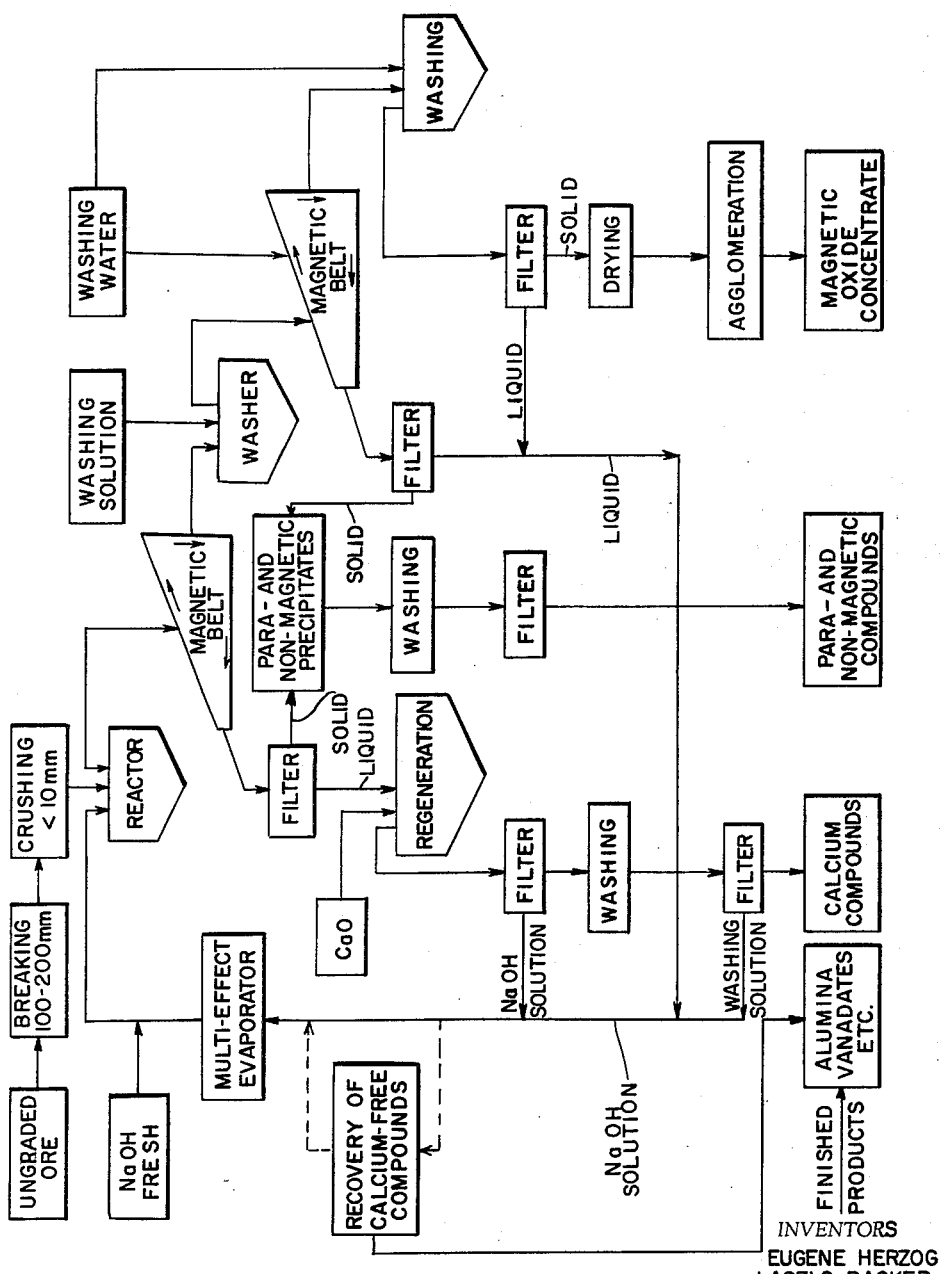

This invention is concerned with a method of applying a chemico-physical treatment to iron containing ores of different origins. It is applicable to all ores consisting of a plurality of elements of which it is desired to promote the concentration, extraction and utilization for example in ironworks. Thus, this method is applicable more particularly but not exclusively to iron ores containing silicates, alumina, aluminates, phosphates, sulphides, vanadates, carbonates, chromium oxides, nickel oxides, as well as to manganese ore, chromium ore, nickel ore, aluminium ore, titanium ore and other ores containing iron compounds.

This method is particularly suitable for treating compound ores to which the different physical methods are scarcely applicable and profitable. However, its field of application is not limited to ores proper. This method is also useful for treating residual products containing iron oxides such as red slimes, or blast-furnace dusts.

According to a feature of this invention the product or ore to be treated is attacked with a concentrated hot alkaline solution adapted to react with siliceous and calcareous compounds, phosphates, alumina, or vanadates, the iron oxides and other metallic oxides remaining insoluble.

According to another feature of this invention the alkaline solution, such as a caustic soda solution, has a concentration by weight of 30% to 50% and preferably about 44% in NaOH, and the temperature is from 100° to 200° C., preferably 130–150° C.

It is known on the other hand that iron ores consist mainly of moderately para-magnetic oxides (iron α sesquioxide, haematite and goethite, or iron γ sesquioxide: lepidocrocite), and that they contain also variable quantities of silica, silicates and calcite. It is known to concentrate these ores in iron oxides, by magnetic separation, after a reduction with $H_2$ and CO gases at high temperatures ranging from 500° C. to 800° C. According to the nature of the ore to be treated, this method requires a fine crushing step (to reduce the ore to particles of diameter from 0.3 to 0.5 millimeter for example, in the case of siliceous and calcareous iron ores such as extracted in the Lorraine district in France).

With the method of this invention the iron ore can be prepared in a considerably simpler manner with higher efficiency. It is advantageous in that it produces an ore enriched in compounds such as the magnetic oxides of iron, leading, after the magnetic sorting or separation steps, to definitely better yields.

According to the method of this invention non-magnetic iron compounds present in the ore are transformed at least partially through a chemical process into ferromagnetic oxides: $Fe_3O_4$ or $\gamma Fe_2O_3$ before the magnetic separation is carried out.

According to one embodiment of the invention, the aforesaid transformation can be so accomplished as to dissolve completely or only very moderately as desired, the elements of the ore which are soluble in aqueous NaOH solution.

According to a further feature of this invention, the aforesaid transformation is obtained through the direct action exerted by an alkaline solution, for example boiling caustic soda, on the iron ore when this ore contains a sufficient proportion of ferrous compounds.

Another way to carry out the invention is to add a ferrous compound or a compound producing ferrous ions, to the caustic soda or other alkaline solution.

In short the main object of this invention consists in transforming non-magnetic iron oxides contained in the ore into ferro-magnetic oxides, another object being to effect a more or less pronounced dissolution of the constitutents soluble in aqueous NaOH solution.

According to another feature of this invention, the magnetic iron oxides are separated by magnetic means, whereafter they are washed and sintered or otherwise agglomerated.

The different steps of the method of this invention can be performed either separately or concurrently.

The following main steps are carried out in the process of this invention:

A first step consisting in attacking the iron ore or ore residues containing iron compounds with a caustic soda solution at 30 to 50% by weight of NaOH and at the boiling temperature under atmospheric pressure or a few degrees C. below the boiling temperature. An effect of this first step is to dissolve progressively substances such as silicates, phosphates, sulphides, vanadates, aluminates, carbonates and thus concentrate, in the insoluble residues, oxides of metals, such as iron, manganese, titanium, nickel and chromium.

Another effect of this chemical treatment, is accomplished during the first step hereinabove, aiming at promoting the production of magnetic iron oxides in the residual substances. This effect is accomplished by the very action of the caustic soda in the case of ore containing a sufficient proportion of ferrous compounds, but ferrous compounds must be introduced into the solution when the ore does not contain a sufficient amount thereof.

Another step consisting in carrying out a physical separation of the solid products insoluble in the alkaline solution namley, first iron oxides by the application of magnetic means and then other insoluble oxides by decanting or filtering.

Concentration of iron as magnetic oxides constitutes by itself one of the essential features of the method of this invention. A detailed description of this method will be given hereafter with the adequate comments.

In most cases, as already set forth hereinabove, it is preferable to introduce ferrous compounds or reducing componds capable of yielding ferrous ions into the caustic soda solution. This can be done for example by introducing these compounds in the form of iron cutting, iron sulphide (FeS), ferrous carbonate ($FeCO_3$) and ferrous sulfate ($FeSO_4$).

The ferrous compound can be added to the caustic alkaline solution in the proportion of 2 to 10% in $Fe^{++}$ of the total weight of iron oxide to be treated.

The transformation takes place very rapidly, for example within 15 to 30 minutes, according to the specific ore to be treated. It takes place before the silica, the alumina and the phosphates are completely dissolved.

A complete cycle of operation will now be described by way of example.

The first step of this cycle is the so-called "magnetic" transformation according to this invention. To this end, the ore to be treated is assayed to determine the presence of ferrous ions, if any, whereafter the ore is crushed. In this step it is sufficient to reduce the ore into particles ranging for example from 3 to 10 mm. in size. The crushed ore is treated with caustic soda under the conditions set forth hereinabove, care being taken, if necessary, to add thereto a ferrous compound or a compound adapted to yield ferrous ions.

In a second step, these solid products in the alkaline solution are subjected to a magnetic separation or sorting under conditions well known to those conversant with the art. In a third step, non-magnetic oxides and hydrates are filtered and then washed.

In a fourth step the magnetic iron oxides, of which the iron content may easily attain or exceed 45 to 50%, are agglomerated either by mechanical compression in the cold state, or by sintering at high temperature, or through any other suitable process. It may simply be noted that the agglomerates contain in general a very low proportion of $Na_2O$, of 0.5 to 1%. by weight.

In a fifth step the alkaline solution is recycled and recovered according to the methods well known in the field.

Experience proved that the yield, after the magnetic sorting operation in the case of ores enriched in iron according to the method of this invention, ranged from 75 to 90% in the case of siliceous ores and in the case of calcareous ores, i.e. from 85 to 95% of the iron contained in the ore.

According to a further characteristic of this invention, the quantity of alkaline solution should be such that the solid to liquid ratio ranges from 10 to 500 grams per liter. This ratio should be selected mainly according to the composition and the nature of the product to be treated and a function of the concentration of compounds soluble in caustic soda (silicates, phosphates, alumina) to avoid side reactions (re-precipitation of silicates, and alumino silicates).

The time during which the ore is treated with the alkaline solution, also called time of attack, may range from 30 minutes to 3 hours.

To explain and develop the above definitions, it may be said that the method of this invention comprises:

(1) A preliminary preparation of the material to be treated (that is, the raw ore or residue). This preparation is generally of physical character (breaking, crushing).

It is sufficient to crush ore to particles having diameter for example from 100 to 200 mm., and to apply a subsequent crushing step in order to obtain less than 10 millimeter diameter particles. The subsequent chemical treatment will break up the particles of 10 mm. to less than $70\mu$. Similarly, the treatment is particularly suitable for processing the fines resulting from the breaking operation which, in the absence of this chemical treatment, are generally valueless and usually lost. The chemical treatment dehydrates the raw ore, and therefore the preliminary drying step, even in the case of very hydrated products (tropical ores at 20 to 30% $H_2O$ for example) can generally be dispensed with.

(2) An alkaline attack by using a caustic soda solution of sufficient concentration.

According to the chemical and physical nautre of the raw product and to the purpose contemplated, a preliminary study is necessary in order properly to ascertain the attack conditions. Thus, the following parameters should be clearly determined:

(a) The concentration of the attack solution which should be adjusted empirically and in principle within the range of from 30 to 50%, of $Na_2O$ by weight of solution.

(b) The solid/liquid ratio yielding the best result in this attack should lie preferably between 10 and 500 grams per liter.

(c) The proportions of ferrous compounds to be added if necessary.

(d) The attack time which, in principle, should be of 30 to 180 minutes.

The reactor equipped with a stirrer operates in general at atmospheric pressure, thus simplifying the technological problems arising from corrosion factors. The presence of silicates and possibly of the other soluble products in the caustic soda solution retards the rate of attack of the various metal containers and parts. In certain cases, the use of nickel steels (2 to 3% Ni) is advisable owing to their resistance to the corrosive action of caustic soda; on the other hand, the use of killed mild steel may also prove satisfactory.

(3) The solid phase is separated from the alkaline solution by a magnetic method utilizing a magnetic belt or means of any suitable design. Afterwards, the solid non-magnetic substances may be separated from the liquid medium of concentrated caustic soda through the conventional methods, such as decanting, filtering, or centrifuging.

The solid-liquid separation by magnetic means (during or after the treatment) will also provide a magnetic sorting action. As the action of the magnetic field is adjustable, the substances or the ferromagnetic oxides differing from one another through their magnetic susceptibility can be separated selectively.

The alkaline solution with insoluble iron oxides may be conveyed by means of an inclined magnetic belt. The iron oxides are thus carried along by the magnetic field and the non-magnetic and paramagnetic particles decant with the alkaline solution. The belt inclination, the rate of flow of the mixture and the intensity of the magnetic field are parameters determining mainly the efficiency of the separation, these factors being selected in each specific case.

Another technique may consist in immersing the magnets in the reactors during the treatment, thus recovering the magnetic oxides as they are formed.

(4) After the solid and liquid phases have been separated, the production cycle continues along two main lines:

(A) The metallic oxides are prepared for their subsequent use in metallurgy.

(B) The alkaline solution is treated to extract or recover therefrom the valuable products and also for regenerating the solution proper.

(A) The iron oxides issuing mainly from the magnetic phase of the separation are washed in order to eliminate the alkaline solution therefrom. This operation has a twofold purpose. Firstly, it is advantageous to reduce the $Na_2O$ content in the concentrate to a proportion lower than 1% by weight of the iron oxides, considering the requirements of modern metallurgy. On the other hand, it is advisable, in order to reduce cost, to recover the whole of the caustic soda, so as to operate without any loss of this product. Therefore, the process is based on the technique of magnetic separation during the washing step carried out either directly on the magnetic belt or after cleaning the product in the stirred washing solutions. In principle, these solutions consist of caustic soda liquors, or pure warm water utilized according either to the so-called counter-current technique. This process also contemplates the use of surface tension agents (0.1 to 0.5 gram per liter) to promote the success and efficiency of the washing step. The thus washed concentrate may be subjected if desired to subsequent magnetic separations for removing non-magnetic oxides mechanically carried along. Preferably, the washing cycle is completed either by agitating in a large excess of water, from 10 to 20 parts of water for 1 part of oxides by weight, since a certain proportion of the soda is chemically bonded and must be hydrolyzed.

The sufficiently purified washed iron oxides are filtered either in vacuo or under pressure ranging from 2 to 5 kilograms per square centimeter. The addition of adjuvant products (for example diatomite) in relatively low proportions (1 to 5%) assists in the filtration.

After filtration, the product contains nearly 30 to 50% by weight of moisture. A drying step carried out either in a rotary kiln or in drying apparatus of different designs (at 70 to 100° C.) will reduce the moisture content to 10 or 15% by weight. At this moisture rate the agglomeration of the product, notably by cold compression, with or without the addition of a binder, is very effective with a load of 300 to 400 kilograms per square centimeter.

It will be noted that the chemical treatment causes the calcite to be partially transformed into calcium hydroxide. This transformation will strongly reinforce the fitness of the product to harden or set after the compression step.

(B) The alkaline solution—which may contain nonmagnetic or paramagnetic products in suspension—is filtered in principle under a pressure of 2 to 5 kilograms per square centimeter and then subjected to a regenerating step with the addition of lime. According to the chemical composition of the solution to be regenerated, the handling takes place either in one phase or in several steps. In the latter case the conditions of precipitation (concentration, time, temperature, addition of seed) must be varied with a view to carry out a fractionated precipitation permitting in the first place the obtaining of more valuable products. The recovery of by-products (silicates, phosphates, alumina, vanadates, chromium oxide, nickel oxide) will strongly reduce the cost of the process. The recovery of alumina from the alkaline solution containing sodium aluminates is very important; it may be effected by conventional processes.

The thus regenerated solution (after its titration has been adjusted by evaporation or the addition of fresh alkali) is recycled and available for subsequent operations. All these operations are managed to reduce as far as possible the caustic soda losses and therefore the operational costs.

The separated and filtered non-magnetic precipitates are treated separately, according to their commercial and technical value, with a view to produce valuable substances such as alumina, silicate of lime, phosphates, and caustic soda.

Thus, for example, in the case of a siliceous ore of the Saiserais region, at the treatment concentration (44% of NaOH by weight) and by adding CaO (0.75 times the stoichiometric quantity) it is possible to precipitate the silicates and a low proportion of the phosphates. Then, after filtering the precipitated products, the solution is diluted up to a concentration of 30% of NaOH by weight and admixed with fresh lime: the remaining phosphates, iron oxides and a low fraction of aluminates are precipitated so that only carbonates, aluminates and sometimes vanadates are left in solution. The aluminates may then be recovered by conventional means. This example illustrates clearly that the method is capable of yielding pure and well-defined by-products (silicates of lime, phosphates of lime, $Al_2O_3$). In general the silicates are eliminated after each treatment by carrying out the regeneration at the initial concentration, but the alkaline solution is subsequently recycled until a certain phosphate and aluminate saturation is achieved ($P_2O_5$: 2 grams per liter, $Al_2O_3$: 12 grams per liter). These products are thus eliminated after every third or fourth successive treatments.

The calcium compounds are also filtered on filters in vacuo or under pressure, mainly on pressure filters, the solid contents of the solution being relatively low (30 to 40 grams per liter). The washing step is carried out after cleaning in a relatively large amount of water: from 10 to 20 parts of water for 1 part of precipitates by weight in order to hydrolyse the sodium compounds. The caustic soda may be eliminated by utilizing surface-tension agents in the washing waters (0.1 to 0.5 grams per liter) or by electrolysis. The washing waters are also reconcentrated to recover the caustic soda by means of multiaction apparatus.

This invention is also concerned with an installation for carrying out the method set forth hereinabove.

In the single figure of the attached drawing given by way of example only a typical installation according to this invention is illustrated.

The drawing shows clearly in diagrammatic form the various operations carried out on a raw ore. The mixture, after being reacted in a suitable reactor with hot concentrated NaOH solution, is fed to a first inclined magnetic belt. The oxides are directed to a washer. The mixture issuing from this washer is fed to a second magnetic belt on which washing water is circulated. The solid particles are taken to another washer, then filtered, dried and agglomerated to yield concentrated magnetic oxides. The liquors from the two magnetic belts are filtered and the solid portions containing the nonmagnetic and paramagnetic products are washed and filtered. The liquor from the first magnetic belt is regenerated with $Ca(OH)_2$ and yields on the one hand solid calcium compounds and on the other hand a caustic soda solution. The liquor from the second magnetic belt is fed to a circuit in which the caustic soda solution is circulated. This solution, if necessary, is freed of calcium free compounds which are also recovered.

A few typical examples of the manner in which the invention may be carried out are described hereunder.

EXAMPLE 1

Iron ore containing ferrous compounds

The method of the invention is particularly adequate for treating highly siliceous iron ores, generally of sedimentary (oölithic) origin, containing relatively high percentages of phosphates, aluminates, and sulphides. These ores are wide-spread (for example in the Lorraine District in France, in Normandy, Morocco, and Spain). The results obtained from ore extracted in Lorraine and having the following composition in the raw state:

|  | Percent |
|---|---|
| Fe (by weight: $Fe_2O_3$, 28.5%; FeO, 10.3%) | 28.0 |
| $SiO_2$ | 20.0 |
| CaO | 6.0 |
| $P_2O_5$ | 1.5 |
| $Al_2O_3$ | 5.0 |
| S (loss on ignition, 14%) | 0.3 | will be illustrated.

It will be noted that a certain amount of the iron content is present in the form of FeO. In this case, the magnetic transformation of the iron oxides takes place automatically, without the addition of foreign elements.

The method consists in:

(1) Breaking the ore to a particle size of less than 10 millimeters.

(2) Attacking the ore with a 45% by weight NaOH solution at boiling temperature during 1 to 3 hours, the solid concentration being 100 grams per liter.

(3) Separating the solid phase from the liquid phase and the magnetic particles from the non-magnetic particles on a magnetic belt.

(4) Washing the iron oxides (ferromagnetic: $Fe_3O_4$) with counter-current washing and stirring on a magnetic belt.

(5) Drying and preparing the concentrate (cold compression) for its practical use in metallurgy.

(6) Regenerating the NaOH solution after filtration by effecting either a single precipitation or selective precipitations for recovering the silicates, aluminates, alumina, phosphates, and vanadates.

(7) Recycling the regenerated NaOH solution in the main circuit.

The chemical composition of the final product is as follows:

|  | Percent |
|---|---|
| Fe (by weight: $Fe_3O_4$, 60 to 66%) | 43 to 48 |
| $SiO_2$ | 6 to 7 |
| CaO | 7 to 9 |
| $P_2O_5$ | 0.2 to 0.3 |
| $Al_2O_3$ | 0 to 1 |
| S (loss on ignition, 15 to 20%) | 0.020 |

EXAMPLE 2

Haematite iron ore

According to an alternate embodiment of the method of this invention the iron ores, mainly those of tropical origin (Africa, India, and Argentina) in which the iron content is generally very satisfactory but characterized by the presence of paramagnetic oxides ($Fe_2O_3$ α), can be refined. In these ores the presence of some detrimental components such as aluminates, phosphates, chromium oxides, nickel oxides, makes the use of these products rather difficult and sometimes impossible in metallurgy.

The treatment is illustrated in the case of an iron ore having the following composition:

| | Percent |
|---|---|
| Fe (by weight: $Fe_2O_3$, 71.5%) | 50.0 |
| $SiO_2$ | 3.0 |
| CaO | 2.0 |
| $Al_2O_3$ (loss on ignition, 8%) | 16.0 |

The caustic soda is used at the rate of 44% NaOH by weight at boiling temperature during 1 to 3 hours by introducing compounds producing ferrous ions ($FeCO_3$, FeS, $FeSO_4$) or additions of an ore containing ferrous compounds. The other conditions are the same as in Example 1.

The final composition is as follows:

| | Percent |
|---|---|
| Fe (by weight: $Fe_3O_4$, 76 to 83%) | 55 to 60 |
| $SiO_2$ | 1 to 2 |
| CaO | 3 to 4 |
| $Al_2O_3$ (loss on ignition, 10%) | 1 to 2 |

EXAMPLE 3

Manganese ore

The process is applicable as well to the purification and concentration of siliceous and phosphorous manganese ores and also to ores having an imporant iron content. In the first case the treatment may be followed, if desired, by a simple solid-liquid separation, without utilizing a magnetic field. In the case of manganese ores having a relatively high iron proportion the magnetic transformation of the iron oxides will permit the elimination of these oxides by magnetic sorting. The treatment is illustrated in the following description of a specific case:

The treated ore has the following composition:

| | Percent |
|---|---|
| Fe (by weight: $Fe_2O_3$, 18.6%) | 13.0 |
| Mn (by weight: $MnO_2$, 52%) | 33.0 |
| $SiO_2$ | 13.5 |
| CaO | 2.0 |
| $P_2O_5$ | 0.2 |
| $Al_2O_3$ (loss on ignition, 10%) | 1.0 |

The use of this ore, due to the high iron content, would yield ferro-manganese with 65 to 70%, by weight of Mn, that is, a lower titration than normally used (75 to 80%). With the method of the invention it is possible to remove iron oxides as $Fe_3O_4$ and so to increase the proportion of $MnO_2$. With another method, whether chemical or physical, this separation would be scarcely beneficial (for example distillation of ferromanganese in vacuo 1,500° C.).

In the method of this invention the crushed manganese ore reduced to particles of less than 10 millimeters is treated with a concentrated 40 to 50% by weight NaOH solution. During the chemical treatment, ferrous salt is added (100 grams of manganese ore and 7 grams of $FeCO_3$ per liter).

The alkaline treatment will, on the one hand, eliminate the silicates, phosphates and aluminates, and, on the other hand, produce the magnetic transformation of the iron oxides.

The magnetic sorting continued after the attack permits of separating a strongly magnetic phase containing the iron oxides, and a paramagnetic phase containing manganese compounds.

Thus the following phases are obtained.

*Phase A (magnetic)*

| | Percent |
|---|---|
| Fe (by weight: $Fe_3O_4$, 69 to 76%) | 50 to 55 |
| Mn (by weight: $MnO_2$, to 6.4 %) | 2 to 4 |
| $SiO_2$ | 1 to 2 |
| $Al_2O_3$ (loss on ignition, 20%) | 0 to 1 |

*Phase B (non-magnetic)*

| | Percent |
|---|---|
| Mn (by weight: $MnO_2$, 71 to 79%) | 45 to 50 |
| Fe (by weight: $Fe_3O_4$, 1.5 to 3%) | 1 to 2 |
| $SiO_2$ | 4 to 5 |
| $Al_2O_3$ (loss on ignition, 20%) | 0 to 1 |

EXAMPLE 4

Red slimes

As set forth hereinabove in the description of the invention, it is possible to refine the residual products containing iron oxides, aluminates, lime, and caustic soda. Therefore, this method is applicable to the treatment of red slimes, blast-furnace dust, and other materials.

Description of the treatment cycle applicable to red slimes:

(1) Preparation of the product (in principle no problem arises as far as the crushing step is concerned).

(2) Treating the product with a 40/45% by weight NaOH solution at boiling temperature, with introduction of ferrous ions or substance yielding same.

(3) Separation of the liquid phase from the solid phase by utilizing a magnetic means, to yield on the one hand iron oxides and on the other hand an alkaline solution containing non-magnetic phases (sodium alumino silicate, titanium dioxide, calcium silicates).

(4) The iron oxides are washed and prepared as set forth in the preceding examples.

(5) The NaOH solution is regenerated and recycled. Several valuable products are recovered, notably a sodium aluminate liquor, from which the alumina can be recovered by a conventional process.

The following table lists certain ores to which the method of the invention can be applied with success:

| Origin of iron ore | Nature of ore | Approximate chemical composition | | | | | |
|---|---|---|---|---|---|---|---|
| | | Fe | $SiO_2$ | CaO | $P_2O_5$ | $Al_2O_3$ | Misc. |
| Lorraine | Siliceous | 28.0 | 20.0 | 6.0 | 1.5 | 5.0 | |
| Do | Calcareous | 28.0 | 10.0 | 13.0 | 1.0 | 3.0 | |
| Normandy | Siliceous | 40.0 | 18.0 | 3.0 | 1.5 | 8.0 | |
| Morocco | do | 40.0 | 18.0 | 3.0 | 1.5 | 5.0 | |
| Spain | do | 45.0 | 13.0 | 3.0 | 2.3 | 7.0 | |
| Guinea | Iron ore containing Al, Cr and Ni. | 50.0 | 1.0 | 2.0 | | 10.0 | Cr 1%, Ni 0.6%. |
| India | Fe-containing Mn ore. | 13.0 | 14.0 | | | 7.0 | 30.0 Mn. |
| Red slimes | | 25.0 | 8.0 | 3.0 | | 20.0 | 10.0% $NaO_2$. |
| Bauxite | | 20.0 | 6.0 | 1.0 | | 45.0 | 3.0% $TiO_2$. |
| Blast-furnace fines. | | 25.0 | 12.0 | 10.0 | 1.0 | | |

In the case of iron ore containing chromium, the alkaline hot suspension of crushed ore is first oxidised by air. The chromium dissolves as chromate in NaOH solution and afterwards the treatment following the invention can be applied as set forth hereinabove.

What we claim is:

1. A process for the treatment of iron oxide ore containing ferrous compounds in association with ferric compounds, said ferrous compounds promoting magnetic transformation of said iron oxide ore for concentrating the iron content thereof and separating it from additional components contained in said ore, which comprises the steps
    (a) of crushing the ore to a particle size of about 10 mm.;
    (b) subjecting the crushed ore to the action of boiling caustic soda solution containing from 300 grams to 500 grams $Na_2O$ per liter; for a time ranging from 10 minutes to 3 hours;
    (c) separating in the boiled solution the magnetic iron oxide obtained by the action of said caustic from the non-magnetic components by means of a magnetic field;
    (d) rinsing the magnetic iron oxide portion and agglomerating it by cold compression;
    (e) separating the solids in the remaining solution of non-magnetic components by decanting and filtering, washing and removing them, while recovering the dissolved compounds by precipitation with lime;
    (f) and recovering the alkaline solution for re-use in the process.

2. The process according to claim 1 for the treatment of iron oxide ores containing all iron ores substantially as ferric compounds including the addition to the crushed ore being boiled with caustic soda solution of a compound which contains iron in bivalent form for promoting the conversion of non-magnetic iron oxides into magnetic iron oxides.

3. The process according to claim 1 including the addition, to the crushed ore being boiled with caustic soda solution, of a material which is capable of yielding ferrous ions under the action of boiling caustic soda solution to raise the total amount of ferrous iron to the proportion of about 2% to about 10% of the total weight of the iron oxide ore being treated.

4. A process according to claim 3 wherein the ferrous material is a member of the group consisting of ferrous sulfide, ferrous sulfate, and ferrous carbonate.

5. The process according to claim 1 wherein the time during which the treatment of the iron oxide ore with caustic soda solution occurs is from 10 to 30 minutes in order to cut down on the dissolution of silica, alumina and phosphates present in the ore.

6. The process according to claim 1 wherein the time during which the treatment of the iron oxide ore with caustic soda solution occurs is from 30 minutes to 3 hours for the purpose of dissolving the silica, alumina and phosphates present in the ore.

7. The process according to claim 1 wherein the magnetic iron oxide obtained after the treatment with caustic soda solution and magnetic separation is washed and purified until its $Na_2O$ is less than 1.0% content by weight and wherein the washing operation is completed by stirring in a large excess of water.

8. The process according to claim 1 wherein the magnetic iron oxide obtained after the treatment with caustic soda solution and magnetic separation is washed and purified until its $Na_2O$ is less than 1.0% content by weight and wherein the washing operation is completed by adding surface tension agents.

9. The method according to claim 2 wherein the ore to be treated is an iron-containing manganese ore to which is added 5 to 10% of its weight of ferrous carbonate, and wherein the solid contents are from 50 to 150 grams per liter of solution, and wherein the treatment with caustic soda solution is carried out for 60 to 180 minutes resulting in a magnetic phase rich in Fe and poor in Mn, and in a non-magnetic phase rich in Mn and poor in Fe.

References Cited by the Examiner
UNITED STATES PATENTS

| | | | |
|---|---|---|---|
| 1,901,192 | 3/33 | Holt et al. | 209—8 |
| 2,074,013 | 3/37 | Bradley | 209—8 X |
| 2,608,469 | 8/52 | McMaster | 75—101 X |
| 2,842,434 | 7/58 | Kippe | 75—2 |

FOREIGN PATENTS 319,309    6/28    Great Britain.

HARRY B. THORNTON, *Primary Examiner.*

HERBERT L. MARTIN, ROBERT A. O'LEARY, *Examiners.*